United States Patent [19]
Barber

[11] Patent Number: 5,745,383
[45] Date of Patent: Apr. 28, 1998

[54] METHOD AND APPARATUS FOR EFFICIENT THRESHOLD INFERENCE

[76] Inventor: Timothy P. Barber, 11931 Chalon La., San Diego, Calif. 92128

[21] Appl. No.: 601,713

[22] Filed: Feb. 15, 1996

[51] Int. Cl.$^6$ .................................................. G06F 17/60
[52] U.S. Cl. .............................. 364/554; 705/35; 705/36; 395/20; 364/420; 364/421; 364/422
[58] Field of Search .................................. 364/554, 151, 364/157, 165, 164, 150, 177, 420, 421, 422, 581; 395/22, 23, 20–21, 235, 236, 237; 705/35, 36, 37

[56] References Cited

U.S. PATENT DOCUMENTS

| | | | |
|---|---|---|---|
| 5,444,819 | 8/1995 | Negishi | 395/22 |
| 5,479,361 | 12/1995 | Kurtberg et al. | 364/552 |
| 5,487,001 | 1/1996 | Neff | 364/421 |
| 5,519,605 | 5/1996 | Cawfield | 364/151 |
| 5,546,329 | 8/1996 | Kurtsberg et al. | 364/552 |
| 5,568,378 | 10/1996 | Wojsznis | 364/164 |
| 5,608,620 | 3/1997 | Lundgren | 395/201 |
| 5,627,768 | 5/1997 | Uhlmann et al. | 364/553 |

OTHER PUBLICATIONS

B Boser, I Guyon, V Vapnik, "A Training Algorithm for Optimal Margin Classifiers", *Proceedings of the 5th ACM Conference on Computational Learning Theory*, Pittsburgh PA, 1992.

Tom Bylander, "Learning Linear Threshold Functions in the Presence of Classification Noise", *Proceedings of the 7th ACM Conference on Computational Learning Theory*, New Brunswick NJ, 1994.

Michael Kearns, "Efficient Noise–Tolerant Learning From Statistical Queries", *Proceedings of the 25th ACM Symposium on the Theory of Computing*, 1993.

HSM Coxeter, "The Functions of Schläfli and Lobatcshefsky", *Twelve Geometric Essays*, Feffer & Simmons, Southern Illinois Press, 1968, pp. 13–29.

K Höffgen, H Simon, "Robust Trainability of Single Neurons", *Proceedings of the 5th ACM Conference on Computational Learning Theory*, Pittsburgh PA, 1992.

Nick Littlestone, "Redundant Noisy Attributes, Attribute Errors, and Linear Threshold Learning Using Winnow", *Proceedings of the 4th ACM Conference on Computational Learning Theory*, Santa–Cruz CA 1991.

L. Schläfli, "On the multiple integral $\int \int \ldots \int dx\, dy \ldots dz$ whose limits are $p_1 = a_1 x + b_1 y + \ldots + h_1 z > 0, p_2 > 0, \ldots, p_n > 0$, and $x^2 + y^2 + \ldots + z^2 < 1$", *Quarterly Journal of Math 3*, 1860, pp. 54–68, 97–108.

*Primary Examiner*—Emanuel Todd Voeltz
*Assistant Examiner*—Patrick Assouad
*Attorney, Agent, or Firm*—Ware, Fressola, Van Der Sluys & Adolphson LLP

[57] ABSTRACT

A method and apparatus for predicting whether a specified threshold is likely to be exceeded for a specified predictor, based on preexisting information about related predictors and associated outcomes. If each predictor vector has n components, and the value of the outcome associated with m such predictor vectors is known, then the present invention shows how to guess the outcome associated with another predictor vector in fewer computational steps and more accurately than any previously known method. The invention is of great use in any situation where it is useful to be able to decide between two alternatives. More generally, the invention can be applied to problems where whether to adopt one alternative or the other depends on the value of a threshold.

22 Claims, 8 Drawing Sheets

METHOD AND APPARATUS FOR EFFICIENT THRESHOLD INFERENCE

TECHNICAL FIELD

This invention relates to systems and methods for predicting, based on historical values of physical parameters, whether a threshold is likely to be exceeded for an assumed set of physical parameters, and, more particularly, to apparatus and methods for estimating, in a way that is efficient enough to be useful in real-world applications, a measure of the likelihood that a specified threshold for any component of a set of correlating physical parameters will be exceeded, the measure being determined based on historical values of the physical parameters, and the measure used to direct the future state of a host apparatus, or to argue in favor of one branch point in a process over another.

BACKGROUND OF THE INVENTION

A problem of general interest in real-world applications of mathematics is how best to project from known binary values associated with given predictor vectors, having components representing different physical parameters, to outcomes associated with other, different, predictor vectors. If a predictor vector consists of one or more components, and the outcome associated with the predictor vector is restricted to be either −1 or +1, or one of any other only two possible values, then the problem amounts to estimating whether the value associated with some predictor vector, not part of the historical data, is more likely to be one or the other of the two possible outcome values.

One approach to this problem is to assume that it can be solved by finding a hyperplane in the vector space of the historical predictor data—each vector in this space having components representing different physical parameters—that divides the possibly multi-dimensional space into two half-spaces, with as many as possible of one possible associated outcome value in one half-space and as many as possible of the other associated outcome value in the other half-space. If a hyperplane that does this half-space division can be found, then all that must be done to project which of the two possible values are most likely to be associated with a data point not part of the historical data is to determine in which half-space the new data point resides.

For example, a real-world problem might be analyzed so that it reduces to determining whether the color associated with a particular point in a two-dimensional vector space is more likely to be red or green, given the color—red or green—of other points in the vector space. The method upon which the present invention is based is to assume that the color can be predicted by finding a hyperplane—which in this case would be just a straight line—that divides the two-dimensional vector space into two halves with as many green points in one half and as many red points in the other half as possible. Once such an optimal hyperplane is found (there can be more than one, although they are all usually of similar tilt in hyperspace), the color of the point in question would be projected to be most likely red or green depending on whether the point lies in the half-space containing mostly red points or the other half-space. Once an optimal hyperplane has been found, the half-spaces are said to have been learned.

The problem with this approach is that it is known to be computationally intense. In fact, finding an optimal hyperplane is classified as NP-complete, meaning that it requires a number of steps that increase exponentially with the number of components of the data points. Because of this exponential growth, methods based on the conventional approach are not feasible for use in real-world applications.

Previously, the best half-space learning method known was given by Michael Kearns, in "Efficient Noise-Tolerant Learning From Statistical Queries", *Proceedings of the 25th ACM Symposium on the Theory of Computing*, 1993. The method of Kearns is conventional in the sense that it attempts to explicitly determine once and for all an optimal hyperplane, and so becomes infeasible when the number of components of the historical data is large.

The infeasibility here is not really a matter of computation time, but computation accuracy. Technically speaking, Kearns' method is just as fast as the method of the present invention, but Kearns loses accuracy rapidly as the number of components grows. Kearns needs on the order of at least $n^2$ data points to provide the same accuracy as the present invention can provide with only n data points; so Kearns' method inevitably suffers from a shortage of historical data, and its infeasibility is not curable by advances in technology.

SUMMARY OF THE INVENTION

In the present invention, one component of the historical data is set aside as the value associated with the other components. The one set-aside component is used to generate what is called here the outcome, and the other components are said to constitute the predictor vector. The outcome is generated by comparing the value of the set-aside component of the historical data with a specified threshold. If the value exceeds the threshold, the outcome is set to +1. Otherwise, it is set to −1.

The threshold in use can be changed dynamically, and the component of the historical data used to generate the outcome can also be changed dynamically, depending on changes in the values of parameters corresponding to states in the real world.

In another embodiment, the present invention is embedded in an artificial intelligence machine that must decide, by discerning a pattern, whether the pattern continues in one sense or in an opposite sense, where each historical data vector encodes, for the pattern, at least an index into the pattern and a value associated with the index.

In yet another embodiment, the present invention is embodied in a computer used for estimating the likelihood of one or another possible outcome of a sporting event pitting a plurality of participants against each other, where each historical data vector encodes, for the sporting event, at least all outcomes of competition between the participants, indexed according to when each competition occurred.

In a still further embodiment, the present invention is programmed in a computer used for predicting a natural disaster, where each historical data vector encodes at least a timedate, location, and severity of previous natural disasters of the kind being predicted.

In accordance with illustrative embodiments of the present invention, the projection of whether the outcome associated with a predictor is more likely to be one alternative or the other is accomplished much faster than was possible by the best prior art half-space learning procedures. More specifically, by using the principles of the present invention, some predictions can be made in "real-time," i.e., sufficiently fast to permit more or less continuous control of a system or apparatus. Other half-space learning problems can be solved sufficiently fast to make approaches based on the present invention economically attractive where the prior art approaches were not economically feasible. Finally, some half-space learning problems which were so large that approaches based on the prior art were not even considered possible can now be solved efficiently by use of approaches in accordance with the present invention.

Figure 2:
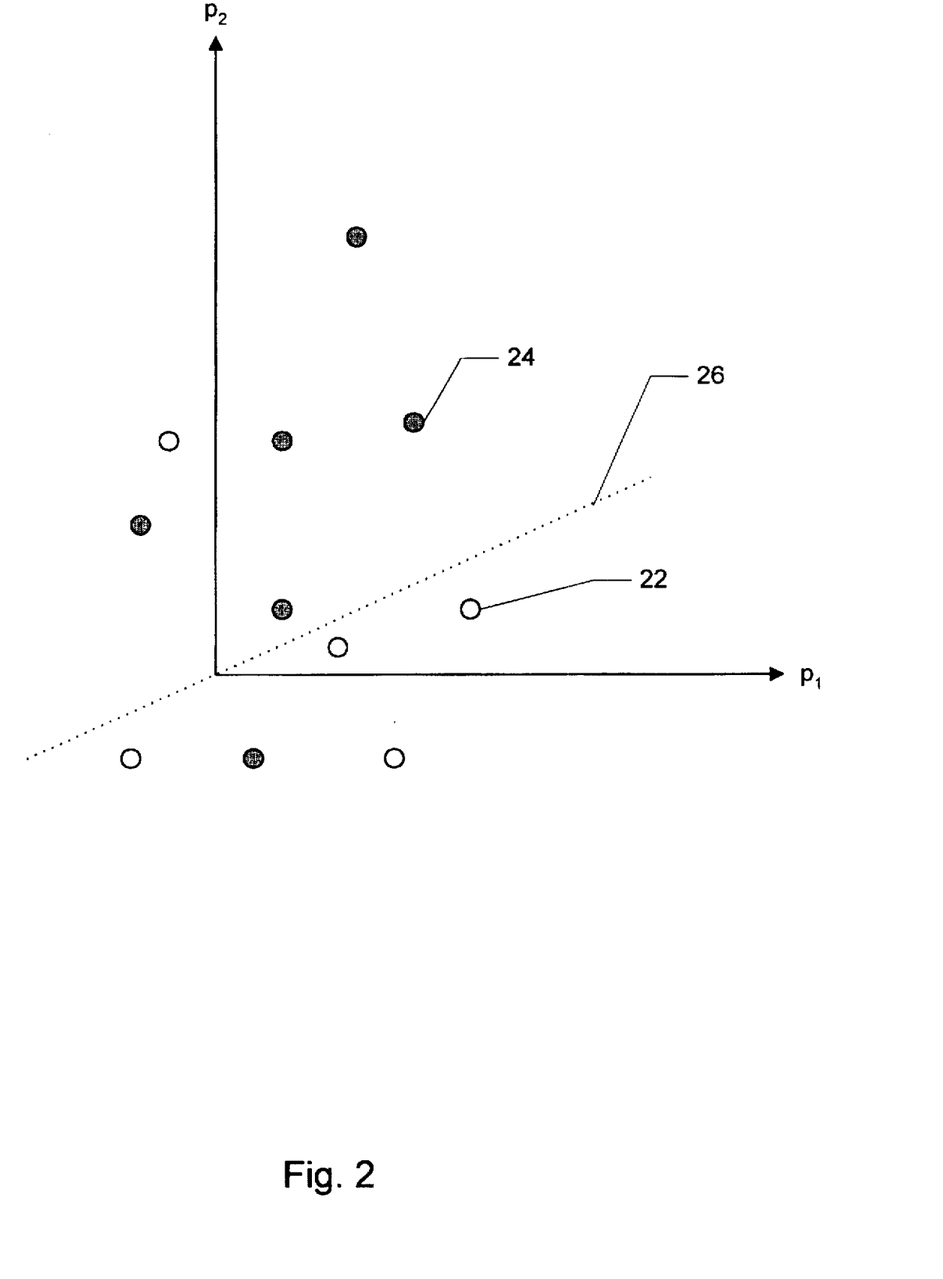
FIG. 2 shows a predictor vector space with the outcome associated with each predictor indicated.

The procedure for achieving these markedly improved benefits, which will be rigorously defined hereinafter, can be understood by referring to FIG. 2, which illustrates a case where the historical data have been used to create a predictor vector space that is only two-dimensional, i.e. where the predictor vectors each have only two components: $p_1$ and $p_2$. Associated with each predictor vector is an outcome, which is represented in FIG. 2 by either an open or a blackened circle.

It is easy to see how to draw an optimal hyperplane in this pedagogic example: draw a line passing through the origin—a constraint of the mathematics used in the present invention—so as to separate the two dimensional space into two halves where in each half there are as many as possible of either the darkened or the opened circles. The line shown in FIG. 2 is an optimal hyperplane.

As the number of predictor values increases, it is still relatively easy for a human to draw the line that separates the two-dimensional space into two half-spaces so that in each half-space there are as many as possible of one outcome or the other. Finding this optimal hyperplane (simply a line when the predictors have only two components) using a computer program is not as straightforward. As noted above, the number of computational steps needed to find an optimal hyperplane increases exponentially with the number of components of the data.

In the present invention, the problem is modified. Instead of trying to find an optimal hyperplane, which would solve the problem once and for all, the approach here is to restrict attention to a particular point of the predictor vector space and ask whether the outcome at that particular point would be more likely one or the other possibility. Therefore, it would be necessary to repeat the calculation performed by the present invention over and over again to find an optimal hyperplane. However, in many applications, an optimal hyperplane is not needed, only an estimate of the outcome for a particular predictor. Thus, in the present invention, complete knowledge, which often requires an unrealistic cost in time and computing resource, is traded for incomplete knowledge, but knowledge that can be had in a time that would make application in the real world feasible, from both the standpoint of time and economy.

In accordance with the present invention, the most likely outcome at a specified predictor is calculated by allowing all possible hyperplanes to "vote" on the outcome, with the vote of each hyperplane weighed in proportion to how successful that hyperplane is at classifying the given predictors, those derived from the historical data, as having one or the other of the possible outcomes, according to how it divides the predictor space into half-spaces.

Any hyperplane will divide the predictor space into two half-spaces, and by convention predictors in some sense above the hyperplane are taken as having associated values, called here outcomes, of +1. Predictors below the hyperplane, in the same sense, are taken to have outcomes of −1. The sense is defined by using a vector to indicate the hyperplane. The hyperplane is defined to be that which is normal (perpendicular) to the indicating vector, and that passes through the origin of the predictor space. Then a predictor is defined to be above a hyperplane according to whether the angle that predictor makes with the indicating vector is less than $\pi/2$ radians. Otherwise, the predictor is said to lie below the hyperplane.

In the present invention all possible hyperplanes are "polled" to learn for some new predictor, not part of the historical data, what each hyperplane would project the outcome to be, according to how each divides up the predictor space into half-spaces. Then the projection of each hyperplane would be assigned a weight according to how well that hyperplane agreed with the known, historical data, i.e. a weight equal to the number of predictors for which the hyperplane would project the correct (historically observed) outcome.

BEST MODE FOR CARRYING OUT THE INVENTION

The newly constructed method for estimating the outcome associated with a predictor, given existing predictor-outcome pairs, will be discussed first, and thereafter the use of this method in technological and industrial systems, apparatus, and procedures, will be explained.

Figure 1:
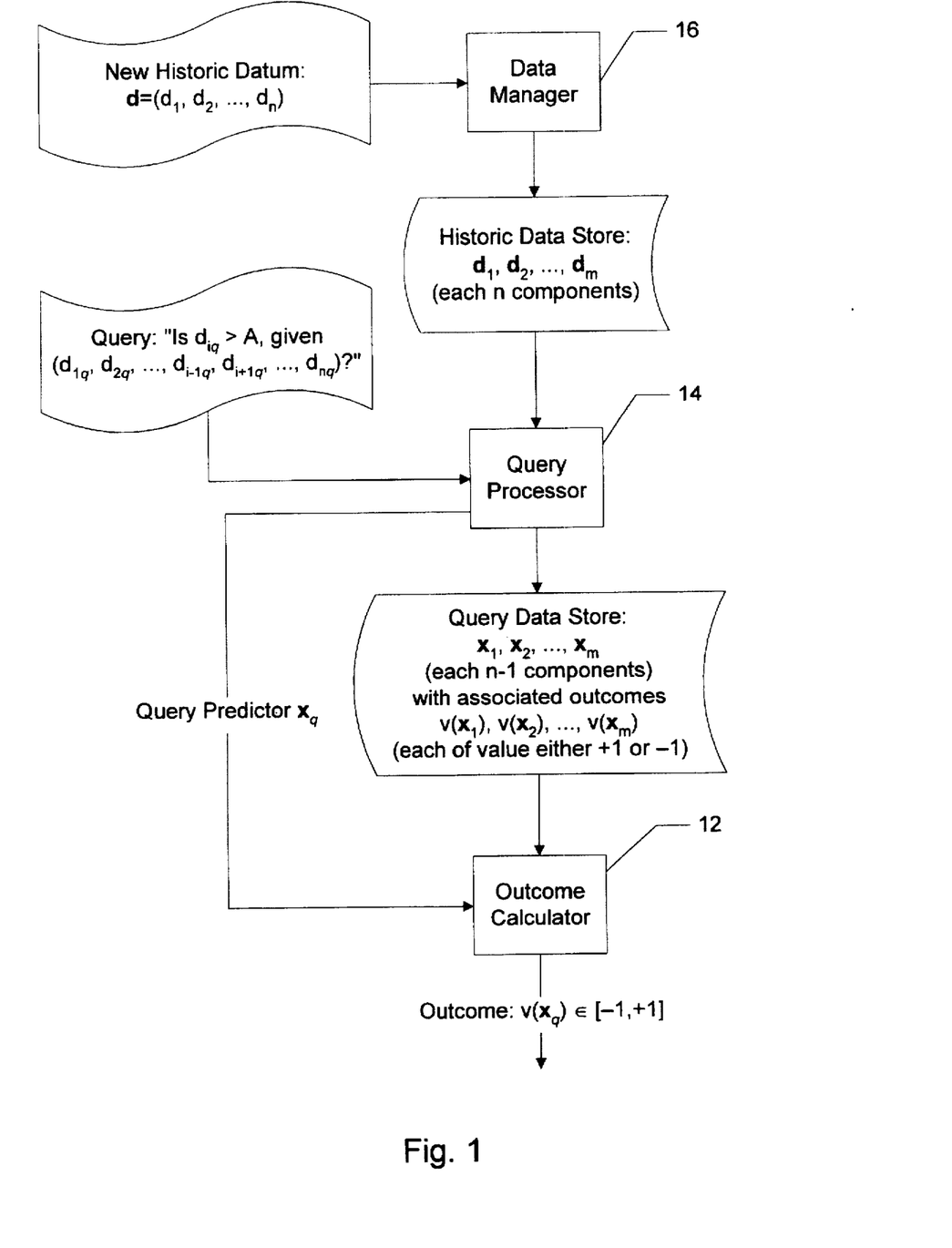
FIG. 1 shows an outcome calculator, which solves the half-space learning problem one datum at a time, along with a data builder and query processor, which collect and maintain the known data and form the queries to which the outcome calculator responds.

In a preferred embodiment of the present invention, as shown in FIG. 1, an outcome calculator 12 is made to respond to a query in terms of a known outcome-predictor data set and given predictor vector. The outcome calculator 12 projects the likely outcome associated with the specified predictor vector. The outcome calculator may phrase its determination in terms of a value ranging from −1 to +1 continuously. For example, −0.2 for the result of the calculation would indicate that the outcome is more likely to be −1 than +1, but only slightly more so.

For the outcome calculator 12, given a predictor vector $\vec{x}_q$ having components $x_{1_q}, x_{2_q}, \ldots x_{p_q}$ where p>0, the outcome $v(\vec{x}_q)$, a number in the range [−1,+1] indicating the likelihood of the outcome being either −1 or +1, is estimated using the weighted average $$v(\vec{x_q}) = \sum_{k=1}^{p} a_k g_k(\vec{x_q})$$

where $a_1, a_2, \ldots, a_p$ are the weights chosen arbitrarily at first, e.g. each set to the value $1/p$, but later according to what works best for each application, and where $$g_k(\vec{x_q}) = \int_{\vec{a}} S(\vec{a} \cdot \vec{x_q}) \left[ \sum_{i=1}^{m} (1 + v_i S(\vec{a} \cdot \vec{x_i})) \right]^k d\vec{a}$$

where $$S(\vec{a} \cdot \vec{x}) = \begin{cases} +1, & \text{if } \vec{a} \cdot \vec{x} \geq 0 \\ -1, & \text{if } \vec{a} \cdot \vec{x} < 0 \end{cases}$$

and where the integral is over all $\vec{a} \in S^{p-1}$, with respect to the unit-norm uniform Lebesgue measure on $S^{p-1}$, denoting by $S^{p-1}$ the surface of a ball of unit surface area in $R^p$, centered on the origin, where the quantity p is the dimensionality of the predictor vector space.

From its definition, function $S(\vec{a} \cdot \vec{x_i})$ calculates whether $\vec{x_i}$ is in one or the other half-space defined by the hyperplane indicated by $\vec{a}$. If $S(\vec{a} \cdot \vec{x_i})$ correctly classifies $\vec{x_i}$, then $S(\vec{a} \cdot \vec{x_i})$ and $v_i$ are the same, yielding the product $v_i S(\vec{a} \cdot \vec{x_i}) = +1$. Otherwise, the product is $-1$. Therefore, the quantity $$n_c(\vec{a}) = \frac{1}{2} \sum_{i=1}^{m} [1 + v_i S(\vec{a} \cdot \vec{x_i})]$$

is exactly the number of points $\vec{x_i}$ that the hyperplane indicated by $\vec{a}$ classifies correctly. For those hyperplanes indicated by $\vec{a}$ where $S(\vec{a} \cdot \vec{x_i})$ agrees with $v_i$, there will be a non-zero positive contribution to the integral over all possible $\vec{a}$. Where $S(\vec{a} \cdot \vec{x_i})$ disagrees with $v_i$, there will be a zero contribution to the integral. By raising the number of examples for which $S(\vec{a} \cdot \vec{x_i})$ agrees with $v_i$ to a power k, the present invention further emphasizes the "votes" of those hyperplanes that are successful in learning the half-space.

A major advantage of the present invention, besides that it provides a projection fast enough to be useful in many real-world applications, is that by providing a projection in the range $[-1,+1]$ it provides a measure of how certain the projection is, where the conventional approach provides simply a guess of one outcome or the other without indicating how certain the projection is. For example, the projection of the present invention may be +0.9 indicating an estimated probability of 95% that the projection is +1 (0.9 is 95% of the interval from −1.0 to +1.0).

For each k, there are various integrals that must be evaluated. These evaluations can be performed by common methods of numerical analysis, such a Monte Carlo estimation. However, for k=1, there is only one integral and it can be evaluated analytically. For k=1, the result is $$g_{k=1}(\vec{x_q}) = S \left\{ \sum_{i=1}^{m} v(\vec{x_i}) \left[ 1 - \frac{2}{\pi} <\vec{x_i}, \vec{x_q}> \right] \right\}$$

where $(\vec{x_i}, \vec{x_q})$ is the angle between the two predictor vectors $\vec{x_i}$ and $\vec{x_q}$. In projecting the outcome $v(\vec{x_q})$, it is sometimes enough to use only the weighting by $n_c(\vec{a})$ for the k=1 power, i.e. to set, in the weighted average, $a_k=0$ for all k except for k=1, and for k=1 to take $a_1=1$.

In the case where there are at least four different predictor components, the outcome calculator can incorporate into a weighted average over different predicted outcomes essentially a non-linear projection, non-linear in the sense that instead of weighting the estimate based on each possible hyperplane in direct proportion to the number of points that hyperplane correctly classifies, the estimate for a hyperplane is raised to a power k>1. In this approach, those hyperplanes that are more successful at classifying points provide a contribution to the total estimate that is exaggerated beyond how the contribution is weighted in the case of the linear weighting.

The evaluation of $g_k$ for k>2 requires that there be at least four components of the predictor. To express $g_k$ for k>2, define $$w_{i+1}(\vec{x_q}) = \frac{1}{m_i} \sum_{j_1 \ldots j_i=1}^{m} \int_{\vec{a}} S(\vec{a} \cdot \vec{x_q}) v_{j_1} S(\vec{a} \cdot \vec{x_{j_1}}) v_{j_2} S(\vec{a} \cdot \vec{x_{j_2}}) \ldots v_{j_i} S(\vec{a} \cdot \vec{x_{j_i}}) d\vec{a}$$

With this definition, $$g_k(\vec{x_q}) = \sum_{i=0}^{k} \binom{k}{i} w_{i+1}(\vec{x_q})$$

The first few $g_k$ are:

$g_1 = w_2$
$g_2 = w_2$
$g_3 = w_2 + w_4/3$
$g_4 = w_2 + w_4$
$g_5 = w_2 + 2w_4 + w_6/5$
$g_6 = w_2 + 10w_4/3 + w_6$

In computing $w_4$, it is possible to use formulas developed by L. Schläfli, in the article "On the multiple integral $\int \int \ldots \int dx dy \ldots dz$ whose limits are $p_1 = a_1 x + b_1 y + \ldots + h_1 z > 0$, $p_2 > 0$, $\ldots$, $p_n > 0$, and $x^2 + y^2 + \ldots + z^2 < 1$", Quarterly Journal of Math 3, 1860, pp 54–68, 97–108. The work of Schläfli was continued and clarified by H. S. M. Coxeter, in the article "The Functions of Schläfli and Lobatcshefsky", Twelve Geometric Essays, 1968, pp 13–29.

In addition, it is possible to estimate $w_4$ and $w_k$ for k greater than 4 by numerical methods, such as Monte Carlo estimation. It can be shown that the use of the Monte Carlo estimate for $w_i$ will typically require computation time on the order of 4 times m to the $i^{th}$ power over the square root of n, where m is the number of data points and n is the number of components of each data point. This is still a drastic improvement over the conventional approach. In the conventional approach of determining an optimal hyperplane the best known methods require time exponential in the number of components of the data points. In fact, the problem is said to be NP-complete, and hence it is unlikely that a feasible method exists.

Also shown in FIG. 1 is a query processor 14 that drives the outcome calculator 12. The query processor uses the historical data maintained by the data builder 16, also shown in FIG. 1, and a query, which may be provided through a user interface or an interface to a system for automatically producing a query when states of the physical world change. The query processor 14 takes the historical data and, based on the query, selects one of the components of the historical data to be the outcome, keeping the other components as predictors of that outcome.

For example, suppose that each datum of the historical data is five components. Suppose the first component is a timedate, the second the value of a stock A, the third the value of stock B, the fourth the value of stock C and the fifth the unemployment rate announced by the US Government at the timedate for this historical datum. A query could be directed to the question of whether one of the second, third or fourth components would be greater than a certain amount given values of the other components. So one query might be "Is the value of stock B likely to be greater than $5.00 per share given a timedate of 3:00 tomorrow afternoon, and given that the value of stock A is $3.00 per share at the given timedate, and that the value of stock C is $6.00 per share then, and finally, that the employment rate then is 1.5%?". With this query, the query processor would select the third component of the historical data-the component corresponding to the price of B—as the outcome, and for the components of the predictor vectors would use the timedate, the value of stock A, the value of stock C, and the employment rate. The query processor would then recast the historical data to correspond to the query by converting each data point of the historical data to an outcome-predictor pair, where the outcome is either −1 or +1 depending on whether the value of stock B for that datum is less than or greater than the query threshold ($5.00 per share in this example).

It is this query data store—the original historical data store recast depending on the query—that the outcome calculator uses to answer the query, i.e. to project the outcome associated with the query predictor $\vec{x}_q$. The query processor 14 would then pass this recast data set—the query data store—to the outcome calculator 12 along with the value of the predictor for which the outcome is desired, the predictor being in this case a vector having as components first the timedate, second the value of stock A, third the value of stock C, and fourth unemployment rate.

This example is pedagogic, offered only to clarify and point out how to use the invention. In a more realistic use of the invention, each historical datum would probably include several components that are either slowly varying in time or are likely to have values that would be known for the value of the predictor at which a query is made. In the example given, it would probably be unrealistic to imagine that the values of stocks A and C would be known at the timedate for which the value of stock B is being queried (through comparison with a threshold). It would be more likely that the treasury bill rate would be known at a future timedate.

A query is always of the form "Is a particular component of the historical data greater than some (threshold) value, given the values of the other components of the historical data?" With reference to FIG. 1, if data points of the historical data set are written as $(d_{1_k}, d_{2_k}, \ldots d_{n_k})$ where k indexes one particular historical datum out of the n, then using a subscript q to indicate the query data point, the query might be written in the form "Is $d_{i_q} > t$, given $(d_{1_q}, d_{2_q} \ldots d_{i-1_q}, d_{i+1_q} \ldots d_{n_q})$?"

For this query the query processor would select the $i^{th}$ component of each of the historical data to be the (historical) outcome and would keep all of the other components to be components of the (historical) predictors. The query processor would then process each of the existing historical data, selecting out the $i^{th}$ component, determining whether it is greater or less than some threshold t, and depending on that, recording an outcome of +1 or −1. The result will be a predictor-outcome data store as illustrated in FIG. 1. In addition to passing this recast data set to the outcome calculator, the query processor passes the value of the predictor $\vec{x}_q$ for which the outcome calculator 12 is to project the outcome $v(\vec{x}_q)$.

In the case of an application for which the result of the query processor is shown in FIG. 2, each predictor vector has only two components, $p_1$ and $p_2$. There are a certain number of predictor outcome pairs known. In FIG. 2, the outcome +1 is shown as an open circle 22, and an outcome −1 is shown as a darkened circle 24. The outcome calculator of the present invention has as its task the projection of whether some new point in the predictor vector space is more likely to have associated with it an outcome of +1 or an outcome of −1.

The conventional approach to this problem has been to determine what is called an optimal hyperplane, optimal in the sense that the plane divides the predictor vector space into two half-spaces each containing as many as possible of one kind of outcome, and on that basis projects the outcome for any predictor not part of the historical data on the basis of which half-space the predictor resides. In the case of a two-dimensional predictor vector space, a hyperplane is just a line. For the problem represented in FIG. 2, an optimal hyperplane is the line 26, since that line separates the predictor vector space into two half-spaces, one containing four open circles and the other containing five darkened circles, and there is no line that can be drawn, passing through the origin, that results in more darkened circles in one half-space and more open circles in the other.

It is clear in FIG. 2 that there are other optimal hyperplanes according to this criteria, as already mentioned, each almost parallel to the line 26 but at a slight angle to that line so that each still separates the predictor vector space into two half-spaces one containing four open circles and the other containing the five darkened circles.

Figure 3:
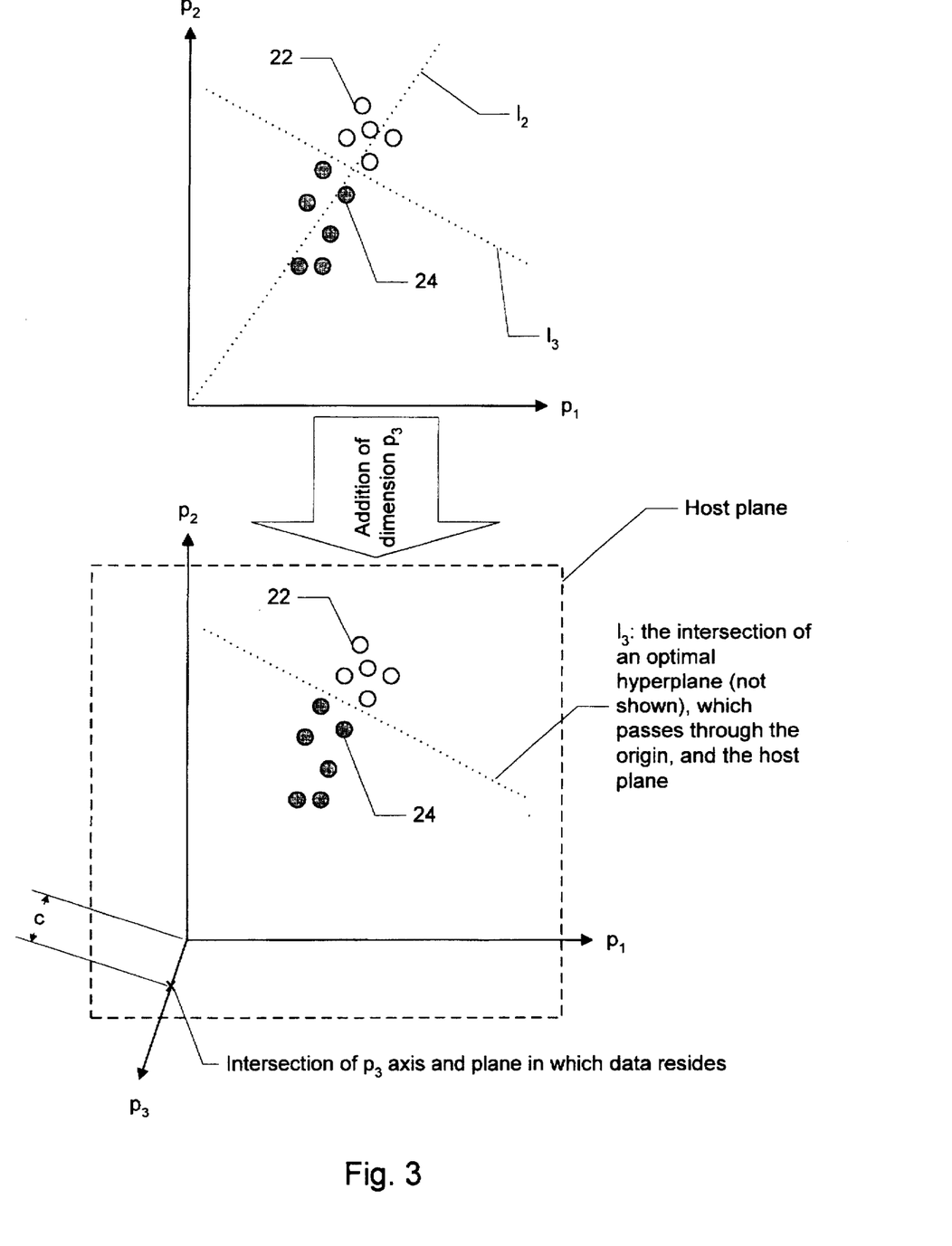
FIG. 3 shows how a predictor vector space might be increased in dimension to make possible a better outcome projection according to the present invention.

In the present invention, the outcome at a new predictor vector is estimated by estimating what the result would be by the conventional approach of determining an optimal hyperplane. In this estimation, all hyperplanes are constrained to pass through the origin. For some configurations of predictor data, this constraint can be a limitation. FIG. 3 shows a query data store for which the constraint that a hyperplane that is optimal pass through the origin leads to the hyperplane $l_2$, where $l_3$ is clearly more successful at classifying the predictor vectors.

Such a limitation may be overcome, according to the present invention, by adding a further component to each predictor vector. Each new component is set equal to some constant value, the same for all predictor values. By doing this, it is possible for an optimal hyperplane to pass through the origin, as it must according to the mathematics of the present invention, and yet classify the points of FIG. 3, for example, just as successfully as does the line $l_3$. In fact, the optimal hyperplane that results from this procedure intersects the plane drawn in FIG. 3 as the line $l_3$.

There are, in fact, many possible values to which the new component of each predictor could be set, and in the present invention, although a default value can be used, the invention allows for the default value to be overwritten, and for other constant values to be used for each new component different from the default value. More generally, this new extra coordinate can be assigned a value that is different for each datum of the historical data, in a way that reflects some aspect of the historical data.

The default value used in the present invention is the root mean square distance to the origin for each of the historical data, defined as follows:

For each example point, compute the square of its distance from the origin.

Take these numbers and compute their average.

Compute the square root of this number. This is the number used by default for the value of each new component added to the historical data to overcome the limitation of having the optimal hyperplane pass through the origin.

Figure 4:
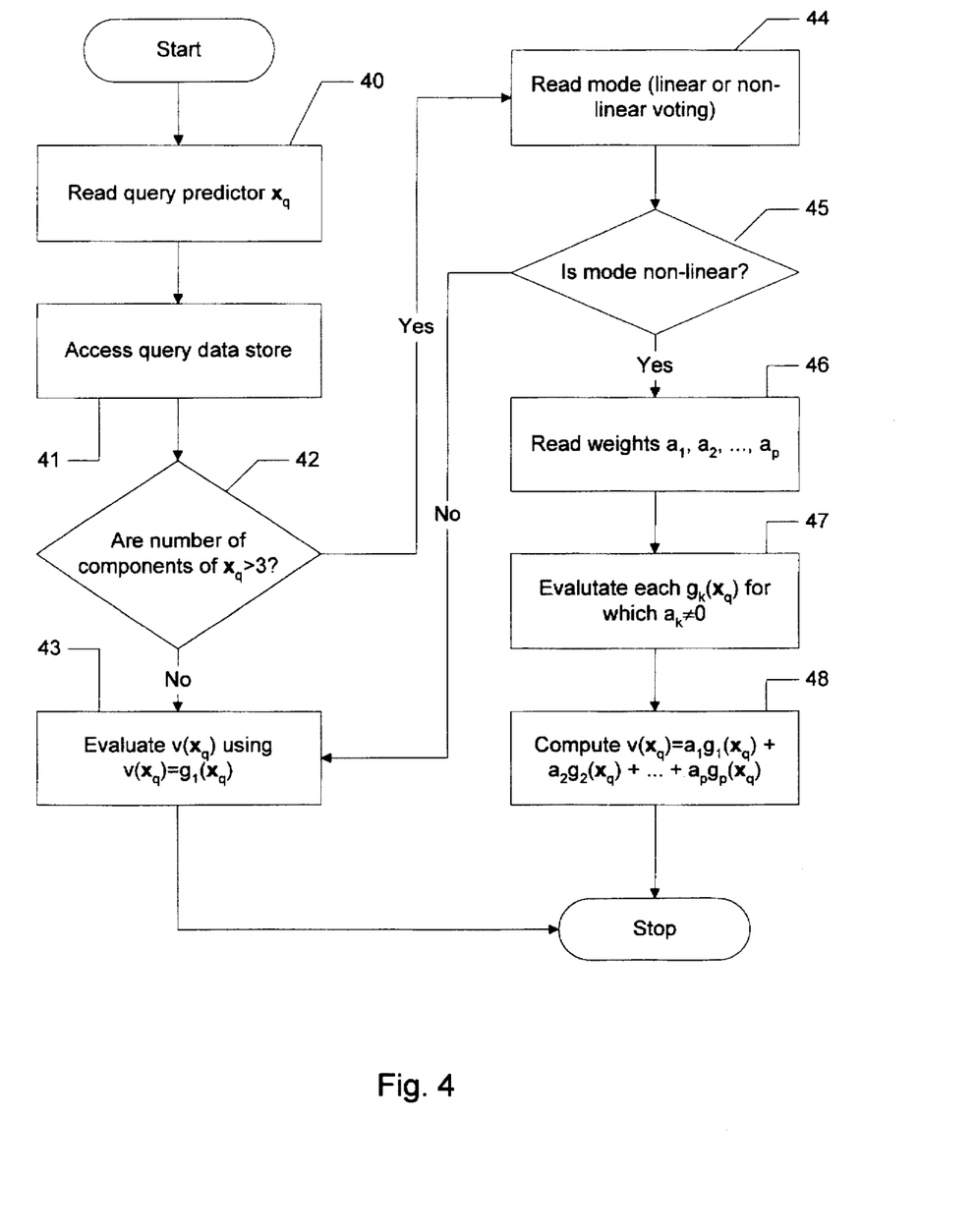
FIG. 4 is a flow chart showing how to calculate an outcome given a particular query and query data store provided by the query processor.

Referring to FIG. 4, the operation of the outcome calculator of FIG. 1 is represented as a flow chart. After the query processor formulates the query and recasts the historical data as the query data store, the outcome calculator is started. First it reads the query predictor $\vec{x}_q$, which may or may not include an additional component to overcome the possible limitation of having each hyperplane pass through the origin. After reading the query predictor $\vec{x}_q$, the outcome calculator accesses the query data store created by the query processor. Next the outcome calculator determines the dimensionality of the query predictor $\vec{x}_q$. If it is less than 4, the outcome calculator evaluates the outcome at the query predictor $\vec{x}_q$ using the closed form expression shown in FIG. 4. If the number of components of the query predictor $\vec{x}_q$ is greater than or equal to 4, then the outcome calculator next reads the mode for the calculation. This mode is preset, going into the calculation.

The mode can be either linear or nonlinear in the case that the number of components of the query predictor $\vec{x}_q$ is greater than or equal to 4. If the mode is required to be linear, then the same closed form expression is used as for the case when the number of query predictor components is less than 4. Otherwise, the outcome calculator uses a weighted average for the calculation of the outcome at the query predictor $\vec{x}_q$.

The next step then is to read the weights $a_1, a_2, \ldots a_p$ for the weighted average. Usually the weights will be zero for $p>4$. Then in the next step shown in FIG. 4, the outcome calculator determines $g_k(\vec{x}_q)$ for each k for which the weight $a_k$ is not zero using the expression in terms of $w_{i+1}(\vec{x}_q)$. As already pointed out, for k=1 or 2, the same closed form expression is used to determine $g_k(\vec{x}_q)$. Also the $w_i(\vec{x}_q)$ is zero for odd i. Finally, the $w_{i+1}$ for i+1 not odd can be evaluated numerically using, for example, Monte Carlo estimation, or a combination of numerical and analytical methods as described above. Finally, with each $w_{i+1}(\vec{x}_q)$ determined that is needed to evaluate each $g_k(\vec{x}_q)$ for each k for which the weight $a_k$ is not zero, the final result, $v(\vec{x}_q)$, is determined by computing the weighted average or linear combination in the last step before stopping.

Figure 5:
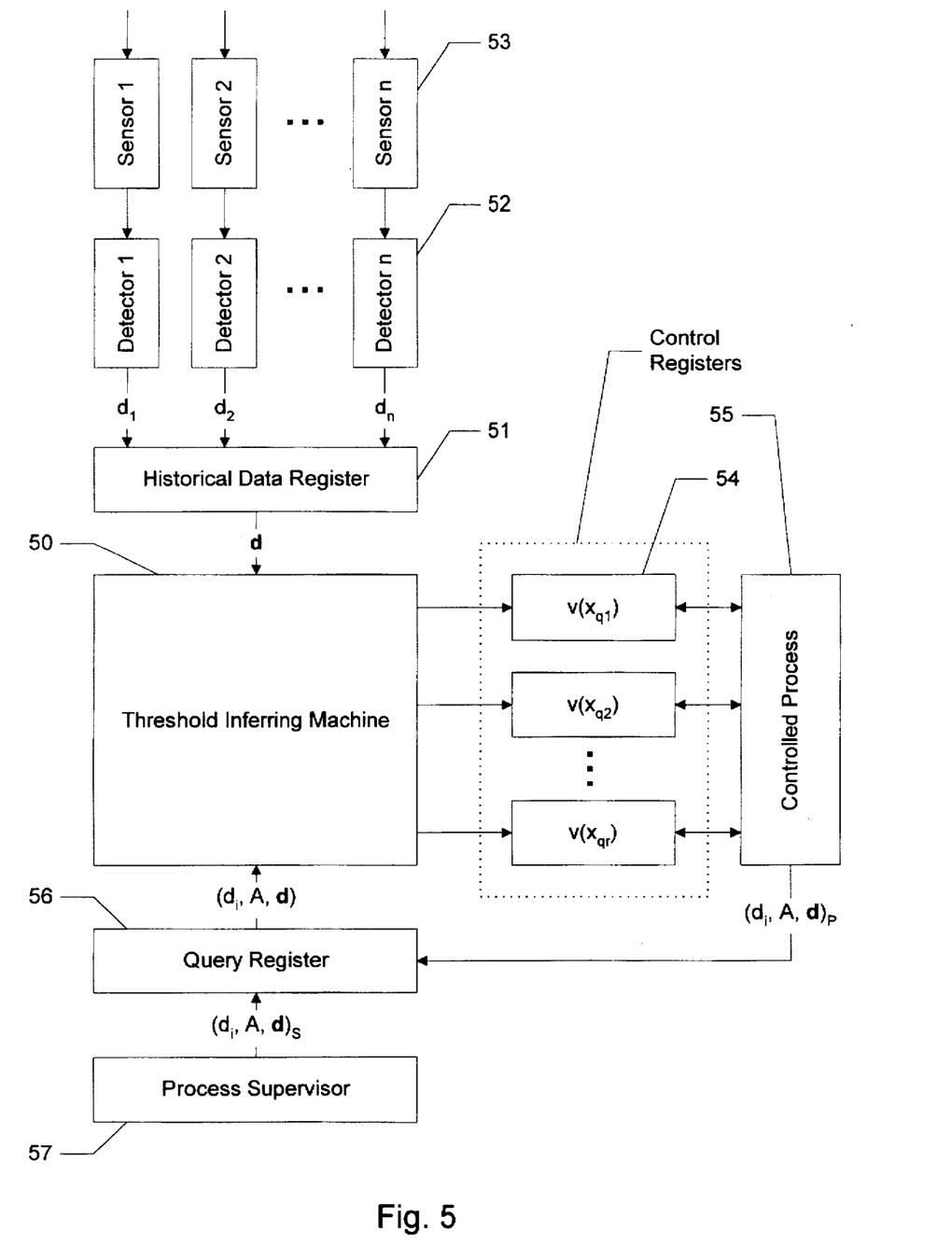
FIG. 5 is a block diagram showing the use of a threshold inferring machine according to the present invention used to control a process.

Referring now to FIG. 5, a threshold inferring machine 50 is embedded in an interface through which it controls a process 55. The interface includes sensors 53, which may sense the physical state of the product being produced by the controlled process, or ambient conditions. The sensors 53 apply inputs to detectors 52 which convert the sensed parameter into a value that can be encoded and stored in a historical data register 51. The threshold inferring machine 50 is driven through the query register 56 to respond to a query, and therefore to provide outcomes 54 which drive the control process 55. This query register may be encoded with a query through either an external source, some kind of intelligent process supervisor 57, or through the control process 55 itself, assuming that the controlled process contains the knowledge of goals to achieve and so can make queries that are sensible and useful.

Figure 6:
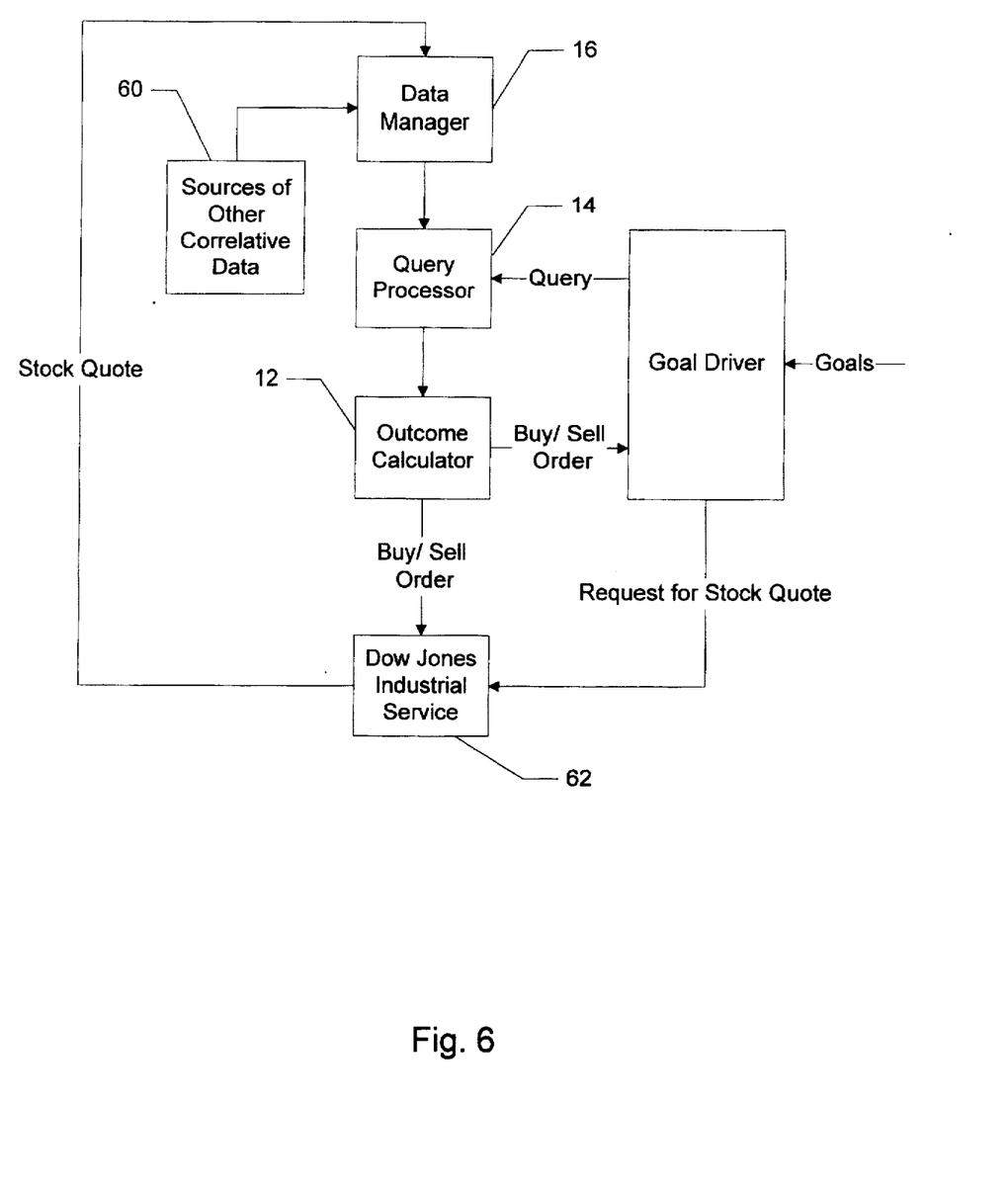
FIG. 6 is a block diagram showing use of the outcome calculator of the present invention as part of the automatic computer stock trading system.

Referring now to FIG. 6, the present invention is shown in an application in which it performs computer stock buying and selling. The goal driver 61 is loaded with a preset goal—some kind of desired financial performance of an investment vehicle. In attempting to reach the goal, the goal driver makes queries that it passes to the query processor 14. In response to each query, the query processor recasts the historical data being maintained by the data manager 16. After formulating the query, the outcome calculator 12 estimates the most likely outcome $v(\vec{x}_q)$ according to the procedure represented by the flow chart of FIG. 4. The result of the calculation can lead to a buy or sell order for a particular stock. That order would be transmitted electronically to a computer of a service such as the Dow Jones Industrial Service. At the same time, the data manager 16 would persist in building more historical data by recording stock quotations that result from requests for stock quotations made by the goal driver 61. In addition, the data manager would most likely be provided with historical data that might correlate with the stock prices, but be slower varying than the stock prices. Of course it would also be possible to provide the data manager with data that might correlate with the stock prices but be faster varying than the stock prices. In initiating this system, the goal driver could be provided with constraints on the volume of trading it is allowed, or any constraints on buying or selling stocks, that would safeguard the investor's portfolio from runaway buying and selling.

Figure 7:
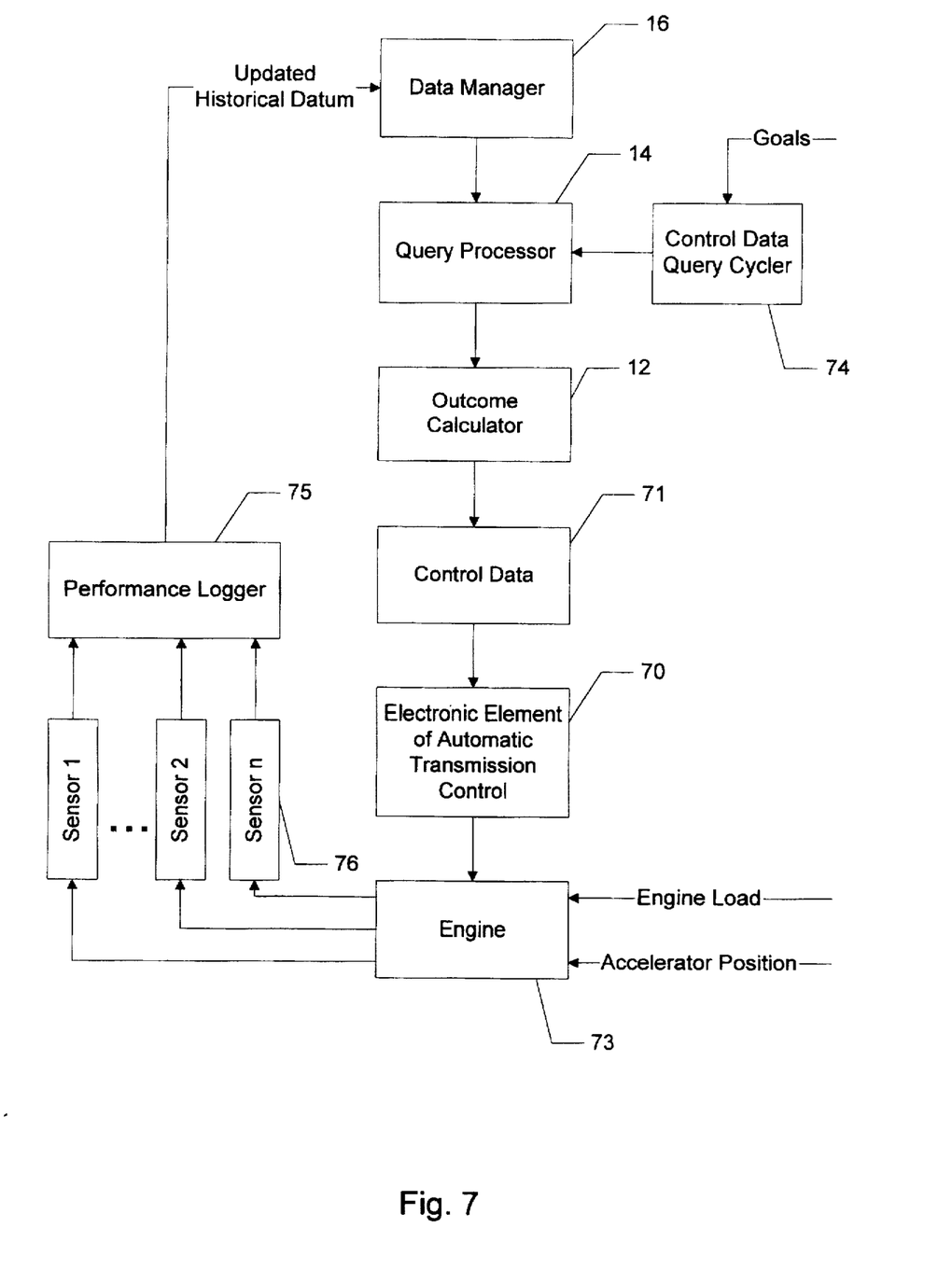
FIG. 7 is a block diagram showing the outcome calculator of the present invention used to determine control data for an electronic/hydraulic automatic transmission control system.

Referring now to FIG. 7, the present invention is shown embedded in a motor vehicle operating as an adjunct to the electronic element of an electronic/hydraulic automatic transmission control. The outcome calculator 12 of this embodiment of the present invention provides control data used by the automatic transmission control to determine when and how to switch gears based on engine load and accelerator position. The outcome calculator 12 determines control data using queries formulated by the query processor in response to inputs from the control data query cycler 74. The query cycler continually cycles through all control data to refine the gear shift program based on changing performance characteristics of the engine, or based on driving habits of the driver. The query processor uses the historical data managed by the data manager 16. The historical data is provided by the performance logger 75, which converts signals from various sensors monitoring engine performance into forms that can be used by the data manager 16 on the one hand, and a form that can be used by the electronic element of the automatic transmission control 70, on the other hand.

Figure 8:
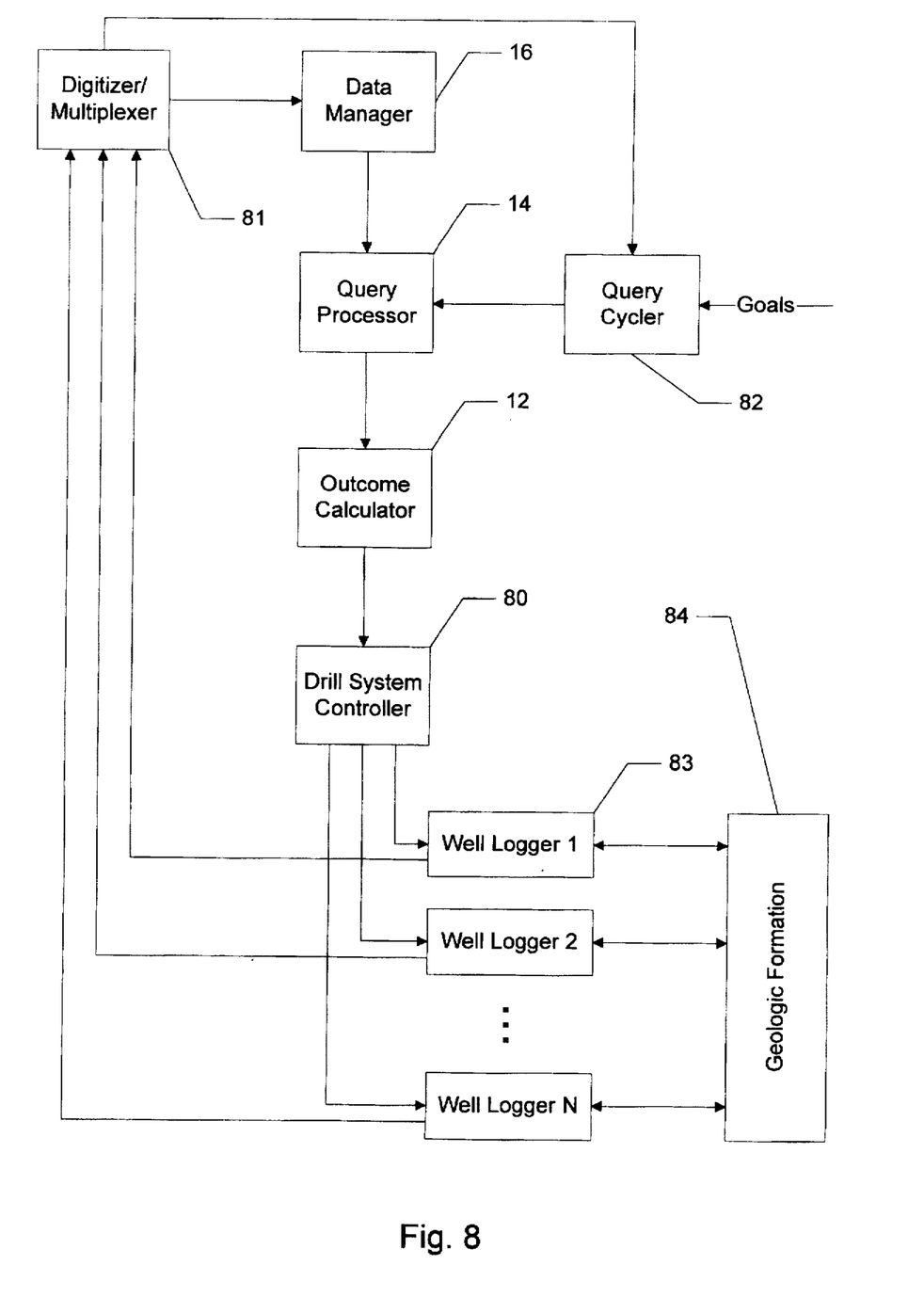
FIG. 8 is a block diagram showing the outcome calculator of the present invention used to provide a drill system controller with a decision to continue drilling on the way to determine if expensive completion procedures should be used after a bore hole has penetrated the possibly productive formation in drilling for oil and natural gas.

FIG. 8 shows the outcome calculator 12 of the present invention embedded in a drilling system for prospecting and exploration for petroleum and gas. In this application, the outcome calculator 12 uses queries formulated by the query processor 14 in response to raw queries from the control data query cycler 82. The queries from the query processor 14 are, as before, in the form of the query predictor $\vec{x}_q$, for which the outcome is desired, and the query data store, which is a recasting of the historical data managed by the data manager 16, in response to the specific query made by the query processor 82, which could be goal-driven. In the case of well-logging and drill-stem testing, after the bore hole has penetrated a possibly productive formation, the formation must be tested to determine if a more expensive completion test should be conducted. The application of the present invention illustrated in FIG. 8 is one in which the outcome calculator assists in evaluating a site using well-logging methods, i.e. methods in which a logging tool is lowered past formations while response signals are relayed to the data manager 16 through a digitizer/multiplexer 81 which converts the sensed signals from various well-logging instruments suitable for input to the data manager 16. On the basis of signals received from the well-logging tools, a decision can is made, with the present invention, whether to perform the more expensive production tests.

In the application illustrated in FIG. 8, the present invention is used as part of a closed loop exploration process, in that the logged data from the various well-logging tools are provided through the digitizer/multiplexer 81 to both the data manger 16 and the query cycler 82. In this way, the query cycle is able, in real-time, to direct queries to the query processor 14 that are appropriate for what is going on at the drill head. At the same time, the historical data is refined and added to by the data manager 16.

The advantage of the present invention in an application such as well-logging, as illustrated in FIG. 8, is that the query processor 14 is able to take historical data and not use all of the components of a predictor vector, so that in the case of drilling at a site where it is not known if the site will ultimately by productive, historical data can be accumulated about the site that is useful, in that, as the drilling progresses, the well-logging tools will nevertheless provide data about those aspects of the site that it directly measures and the outcome calculator will be able to estimate if further drilling is likely to provide data that would yield further reason to expect, ultimately, a successful production test, based on knowledge of those components of the predictor vector observed in other well sites, and the eventual success or failure of drilling at those other sites.

In fact, the present invention provides for a remarkable range for flexibility in its application. The outcome calculator of the present invention may be constructed so that it is able to handle predictor vectors with a range of components. It is a major advantage of the present invention that it allows for using a subset of historical data, the subset being what is appropriate for the situation at hand. This ability is similar to a major strength of our own intelligence; it is one practice we use when we display common sense: we use a basis of experience in what may be another area to determine best how to act in a circumstance that shares some features with circumstances in that other area, but is not exactly the same.

While the present inventor has constructed a new method for inferring if a threshold for a physical parameter is likely to be exceeded, given historical examples of the relationship between the physical parameter and other, correlating, physical parameters, it is to be understood that claims of this invention relate only to the application of this novel method to real-world technological or industrial systems that lend themselves to control or modeling through threshold prediction by representing the variables characterizing the system or process. More specifically, it is to be understood that the claims of this invention relate only to a method or system to control or model the performance of processes, machines, manufactures, or compositions of matter. All other uses of the new method, such as computation research, or algorithm research form no part of the present invention. Similarly, use of the new method in non-technological or non-industrial systems likewise form no part of the present invention.

Having now disclosed the invention, what is claimed is:

1. A method for discriminating by a control system between two alternatives, the discrimination based on inferring the likelihood of each alternative compared to the other, the alternatives corresponding to values of $-1$ or $+1$ of a physical outcome $v(\vec{x}_q)$ associated with a set of predictor values $\vec{x}_q$ representing assumed values of a set of physical parameters, the physical outcome $v(\vec{x}_q)$ ranging in value from $-1$ up to and including $+1$ and representing the likelihood of each alternative compared to the other, the method comprising the steps of:

i) estimating the physical outcome $v(\vec{x}_q)$ based on other outcomes $v(\vec{x}_1), v(\vec{x}_2), \ldots v(\vec{x}_m)$ associated with other predictor values $\vec{x}_1, \vec{x}_2, \ldots, \vec{x}_m$, each predictor having p components where p>0, and ii) inferring that the alternative closer to the estimated value of the physical outcome $v(\vec{x}_q)$ will be the alternative more likely to occur, the likelihood expressed by how close the estimated value of the physical outcome $v(\vec{x}_q)$ lies to the nearer alternative, wherein the improvement comprises estimating the physical outcome $v(\vec{x}_q)$ according to a weighted average $$v(\vec{x}_q) = \sum_{k=1}^{p} a_k g_k(\vec{x}_q)$$

where $a_1, a_2, \ldots, a_p$ are the weights of the weighted average such that $a_1+a_2+\ldots+a_p=1$, and where $$g_k(\vec{x}_q) = \int_{-a}^{a} S(\vec{a}\cdot\vec{x}_q) \left[ \sum_{i=1}^{m} (1 + v_i S(\vec{a}\cdot\vec{x}_i)) \right]^k d\vec{a}$$

which yields a value between $-1$ and $+1$.

2. A method as claimed in claim 1, wherein p=1 and $v(\vec{x}_q)$ is evaluated according to the closed form expression $$v(\vec{x}_q) = S \left\{ \sum_{i=1}^{m} v(\vec{x}_i) \left[ 1 - \frac{2}{\pi} <\vec{x}_i,\vec{x}_q> \right] \right\}.$$

3. An apparatus for inferring from existing data if, for a specified predictor vector, a possible outcome is likely to exceed a specified threshold, so as to control the state of a host machine that communicates with the apparatus, comprising:

a. a data builder for receipt of a historical data vector $d_i$ having n components where n is an integer greater than an integer p, the integer p being at least one; the data builder generating a historical data set consisting of historical data vectors $\vec{d}_1, \vec{d}_2, \vec{d}_3, \ldots, \vec{d}_m$ by adding the received historical data vector $\vec{d}_i$ to the historical data vectors previously received;

b. a query processor communicating with the historical data set generated by the data builder, the query processor for receiving a query specifying a threshold and a predictor vector $\vec{x}_q$ having n-1 components, and for creating a predictor-outcome data set of predictor vectors $\vec{x}_1, \vec{x}_2, \ldots \vec{x}_m$ and associated outcomes $v(\vec{x}_1), v(\vec{x}_2), \ldots, v(\vec{x}_m)$ which are each either $+1$ or $-1$, based on the historical data set and the specified threshold;

c. an outcome calculator communicating with the query processor, for inferring the outcome $v(\vec{x}_q)$ associated with the specified predictor vector $\vec{x}_q$ using the predictor-outcome data set provided by the query processor, wherein the outcome calculator predicts the outcome $v(\vec{x}_q)$, using the m historical data predictor vectors $\vec{x}_i$ and associated outcomes $v(\vec{x}_i)$, according to a weighted average $$v(\vec{x}_q) = \sum_{k=1}^{p} a_k g_k(\vec{x}_q)$$

where $a_1, a_2, \ldots, a_p$ are the weights of the weighted average such that $a_1+a_2+\ldots+a_p=1$, and where $$g_k(\vec{x}_q) = \int_a \vec{S}(\vec{a} \cdot \vec{x}_q) \left[ \sum_{i=1}^{m} (1+v_i S(\vec{a} \cdot \vec{x}_i)) \right]^k d\vec{a}$$

yielding a value for $v(\vec{x}_q)$ between $-1$ and $+1$, so as to control the state of the host machine.

4. An apparatus as claimed in claim 3, wherein p=1 and $v(\vec{x}_q)$ is evaluated according to the closed form expression $$v(\vec{x}_q) = S \left\{ \sum_{i=1}^{m} v(\vec{x}_i) \left[ 1 - \frac{2}{\pi} <\vec{x}_i, \vec{x}_q> \right] \right\}.$$

5. An apparatus as claimed in claim 3, wherein the host machine is a computer used for trading a stock, and wherein each historical data vector encodes, for the stock, at least a timedate of a trade and a price at which the stock traded on that timedate.

6. An apparatus as claimed in claim 3, wherein the host machine is an artificial intelligence machine that must decide, by discerning a pattern, whether the pattern continues in one sense or in an opposite sense, and wherein each historical data vector encodes, for the pattern, at least an index into the pattern and a value associated with the index.

7. An apparatus as claimed in claim 3, wherein the host machine is a computer used for estimating the likelihood of one or another possible outcome of a sporting event pitting a plurality of participants against each other, and wherein each historical data vector encodes, for the sporting event, at least all outcomes of competition between the participants, indexed according to when each competition occurred.

8. An apparatus as claimed in claim 3, wherein the host machine is a controller for a drill used for drilling into the earth to tap reserves of oil and natural gas, and wherein each historical data vector encodes mineralogical assays from samples taken at different sites, and at different depths at each site, along with a site identifier and an estimate of the amount of oil and natural gas found at each site.

9. An apparatus as claimed in claim 3, wherein the host machine is a computer for predicting a natural disaster, and wherein each historical data vector encodes at least a timedate, location, and severity of previous natural disasters of the kind being predicted.

10. An apparatus as claimed in claim 3, wherein the query processor adds another dimension to the query data store, beyond what is just needed to house the query data store, and places all of the query data store data on a hyperplane in the enlarged query data store at some non-zero distance in the direction of the new dimension, such as the root-mean-square distance of the historical data from the origin of the vector space before it is enlarged to accommodate the new dimension.

11. A method for discriminating by a decision support system between two alternatives, the alternatives corresponding to whether an outcome is more likely to exceed a specified threshold, the method comprising the steps of:

a. building a historical data set of historical data vectors $\vec{d}_1, \vec{d}_2, \vec{d}_3, \ldots, \vec{d}_m$ each having n components where n is an integer greater than one, each historical data vector encoding at least an index and an associated outcome;

b. converting the historical data set into a predictor-outcome data set based on a specified threshold and a specified predictor vector $\vec{x}_q$ having n-1 components, the predictor-outcome data set consisting of predictor vectors $\vec{x}_1, \vec{x}_2, \ldots, \vec{x}_m$, encoding at least the index, and the associated outcomes $v(\vec{x}_1), v(\vec{x}_2), \ldots, v(\vec{x}_m)$, each having a value of either $+1$ or $-1$ based on whether or not the outcome exceeds the specified threshold and the historical data;

c. estimating the outcome $v(\vec{x}_q)$ using the m historical data predictor vectors $\vec{x}_i$ and associated outcomes $v(\vec{x}_i)$, according to a weighted average $$v(\vec{x}_q) = \sum_{k=1}^{p} a_k g_k(\vec{x}_q)$$

where $a_1, a_2, \ldots, a_p$ are the weights of the weighted average such that $a_1+a_2+\ldots+a_p=1$, and where $$g_k(\vec{x}_q) = \int_a \vec{S}(\vec{a} \cdot \vec{x}_q) \left[ \sum_{i=1}^{m} (1+v_i S(\vec{a} \cdot \vec{x}_i)) \right]^k d\vec{a},$$

yielding a value for $v(\vec{x}_q)$ between $-1$ and $+1$, and d. indicating a discrimination in favor of the alternative corresponding more closely to the estimated outcome.

12. An method as claimed in claim 11, wherein p=1 and $v(\vec{x}_q)$ is evaluated according to the closed form expression $$v(\vec{x}_q) = S \left\{ \sum_{i=1}^{m} v(\vec{x}_i) \left[ 1 - \frac{2}{\pi} <\vec{x}_i, \vec{x}_q> \right] \right\}.$$

13. A method as claimed in claim 11, wherein the method is used for trading a stock, and wherein each historical data vector encodes, for the stock, at least a timedate of a trade and a price at which the stock traded on that timedate.

14. A method as claimed in claim 11, wherein the method is used to decide, by discerning a pattern, whether a pattern continues in one sense or an opposite sense, and wherein each historical data vector encodes, for the pattern, at least an index into the pattern and a value associated with the index.

15. A method as claimed in claim 11, wherein the method is used for estimating the likelihood of one or another possible outcome of a sporting event pitting a plurality of participants against each other, and wherein each historical data vector encodes, for the sporting event, at least all outcomes of competition between the participants, indexed according to when each competition occurred.

16. A method as claimed in claim 11, wherein the method is used to determine whether to drill into the earth in a particular location to tap reserves of oil and natural gas, and wherein each historical data vector encodes mineralogical assays from samples taken at different sites, and at different depths at each site, along with a site identifier and an estimate of the amount of oil and natural gas found at each site.

17. A method as claimed in claim 11, wherein the method is used to predict a natural disaster, and wherein each historical data vector encodes at least a timedate, location, and severity of previous natural disasters of the kind being predicted.

18. An method as claimed in claim 11, wherein the predictor-output data set is made larger by one dimension compared to what is just needed based on the dimensionality of the historical data, and places all of the predictor-output data on a hyperplane in the enlarged vector space at some non-zero distance in the direction of the new dimension, such as the root-mean-square distance of the historical data from the origin of the vector space before it is enlarged to accommodate the new dimension.

19. A method for use by a decision support system in concluding whether a first physical parameter is likely to exceed a specified threshold assuming particular values of physical parameters expected to be correlated with the first parameter, so-called associated parameters, and provided historical information consisting of values of the first physical parameter for various values of the associated parameters, the method comprising the steps of:

(1) determining if the threshold was crossed for each of the historical parameter sets, in other words determining what in each instance historically the projection happened to be, (2) determining whether the particular values associated with the first physical parameter lie in one half-space or another for each possible division into two half-spaces of the space in which the historical parameter sets of step (1) reside, (3) estimating the likelihood that the first physical parameter will exceed the specified threshold by calculating an average over the projections made on the basis of each half-space division, weighted by how many of the historical parameter sets were correctly projected, and (4) indicating a conclusion based on the estimated likelihood that the first physical parameter will exceed the specified threshold.

20. A method as claimed in claim 19, wherein the weighting of step (3) is a number equal to how many of the historical parameters sets were correctly projected raised to a power greater than one, thereby further emphasizing contributions to the projection based on more successful half-space divisions relative to contributions to the projection based on half-space divisions that correctly projected a smaller number of the historical parameter sets.

21. A process controller for use with a general purpose digital computer, said controller providing control based on estimating a probability that a physical outcome $v(\vec{x}_q)$ associated with a set of predictor values $\vec{x}_q$, representing assumed values of physical parameters, is more likely to be one or another of only two possible outcomes $-1$ or $+1$, the probability being expressed as a number between $-1$ and $+1$, the estimation based on other outcomes $v(\vec{x}_1), v(\vec{x}_2), \ldots, v(\vec{x}_m)$ associated with other predictor values $\vec{x}_1, \vec{x}_2, \ldots, \vec{x}_m$, each predictor having p components where $p > 0$, said controller comprising a computer program storage medium having a computer program stored thereon for execution by said digital computer, said program comprising means for estimating the outcomes according to a weighted average $$v(\vec{x}_q) = \sum_{k=1}^{p} a_k g_k(\vec{x}_q)$$

where $a_1, a_2, \ldots, a_p$ are the weights of the weighted average such that $a_1 + a_2 + \ldots + a_p = 1$, and where $$g_k(\vec{x}_q) = \int_{\vec{a}} S(\vec{a} \cdot \vec{x}_q) \left[ \sum_{i=1}^{m} (1 + v_i S(\vec{a} \cdot \vec{x}_i)) \right]^k d\vec{a}$$

which yields a value between $-1$ and $+1$.

22. A process controller as claimed in claim 21, wherein $p=1$ and $v(\vec{x}_q)$ is evaluated according to the closed form expression $$v(\vec{x}_q) = S \left\{ \sum_{i=1}^{m} v(\vec{x}_i) \left[ 1 - \frac{2}{\pi} <\vec{x}_i, \vec{x}_q> \right] \right\}.$$

* * * * *

UNITED STATES PATENT AND TRADEMARK OFFICE
CERTIFICATE OF CORRECTION

PATENT NO. : 5,745,383
DATED : April 28, 1998
INVENTOR(S) : Timothy P. Barber

It is certified that error appears in the above-identified patent and that said Letters Patent is hereby corrected as shown below:

Columns 6, lines 21 and 22 recite, $$``w_{i+1}(\bar{x}_q) = \frac{1}{m_i} \sum_{j_1 \ldots j_i = 1}^{m} \int_{\bar{a}} S(\bar{a} \cdot \bar{x}_q) v_{j_i} S(\bar{a} \cdot \bar{x}_{j_1}) v_{j_2} S(\bar{a} \cdot \bar{x}_{j_2}) \ldots v_{j_i} S(\bar{a} \cdot \bar{x}_{j_i}) d\bar{a}\text{''}$$

but should recite, $$\text{--}\, w_{i+1}(\bar{x}_q) = \frac{1}{m_i} \sum_{j_1 \ldots j_i = 1}^{m} \int_{\bar{a}} S(\bar{a} \cdot \bar{x}_q) v_{j_1} S(\bar{a} \cdot \bar{x}_{j_1}) v_{j_2} S(\bar{a} \cdot \bar{x}_{j_2}) \ldots v_{j_i} S(\bar{a} \cdot \bar{x}_{j_i}) d\bar{a}\, \text{--.}$$

Signed and Sealed this

Twenty-eighth Day of July, 1998

Attest:

BRUCE LEHMAN

Attesting Officer     Commissioner of Patents and Trademarks